United States Patent [19]

Akodes

[11] Patent Number: 4,921,334

[45] Date of Patent: May 1, 1990

[54] MATRIX LIQUID CRYSTAL DISPLAY WITH EXTENDED GRAY SCALE

[75] Inventor: Boris A. Akodes, Brookline, Mass.

[73] Assignee: General Electric Company, Wilmington, Mass.

[21] Appl. No.: 220,660

[22] Filed: Jul. 18, 1988

[51] Int. Cl.[5] .......................... G02F 1/13; G09G 3/36

[52] U.S. Cl. .................................... 350/333; 350/332; 340/784; 340/793; 358/315; 358/168; 358/236; 358/443

[58] Field of Search ................ 350/332, 333; 340/784, 340/713, 793; 358/315, 35, 339, 168, 283, 180, 236

[56] References Cited

U.S. PATENT DOCUMENTS

| | | | |
|---|---|---|---|
| 4,427,978 | 1/1984 | Williams | 340/784 |
| 4,745,485 | 5/1988 | Iwasaki | 358/236 |
| 4,766,430 | 8/1988 | Gillette et al. | 358/236 X |
| 4,769,713 | 9/1988 | Yasui | 358/235 |
| 4,779,083 | 10/1988 | Ishii et al. | 340/784 X |
| 4,808,991 | 2/1989 | Tachiuch et al. | 340/784 X |

*Primary Examiner*—Stanley D. Miller
*Assistant Examiner*—Huy K. Mai
*Attorney, Agent, or Firm*—I. David Blumenfeld

[57] ABSTRACT

The perceived gray scale brightness levels of a Matrix Addressed Liquid Crystal Display are increased over the number of levels provided by the existing data line driver hardware and the gray scale voltage increments by providing an extra command bit position. For time multiplexing the gray scale voltage increment on a pixel during successive frames. For an extra bit value of 0 the gray scale voltage is the same during alternate frames providing a given brightness level. For an extra command bit value of 1, the gray scale voltage increment applied to the pixel and the brightness level, is switched (dithered) between voltages during successive frames. The eye integrates the levels and the perceived gray scale brightness level is the average value of brightness thus, doubling the number of perceived gray scale levels.

5 Claims, 3 Drawing Sheets

40
PERCEIVED BRIGHTNESS FOR FIVE (5) BIT GRAY SCALE 11001
GRAY SCALE V
V1
V12
V13
V16
BF ON
B13
B12.5
B12
B1
BRIGHTNESS (FT-LAMBERTS)

MATRIX LIQUID CRYSTAL DISPLAY WITH EXTENDED GRAY SCALE

The invention relates to a Liquid Crystal Display in a X-Y Matrix Format with Gray scale capability and, more particularly, to a Liquid Crystal Display in which the number of visually perceived gray scale levels is larger than the number of availble gray scale voltage increments used to energize the pixels in the matrix.

BACKGROUND OF THE INVENTION

In Matric Addressed Liquid Crystal Displays, X data column lines and Y switching row lines are connected through thin film field effect transistors (FETs) to individual Liquid Crystal Display cells or pixels. In such a display the individual pixels are sequentially connected to their associated data lines as the field effect transistors are switched on from the switching lines.

Liquid Crystal Display devices, typically consist of a pair of flat panels of substrates sealed at their outer edges to form a chamber containing a Liquid Crystal material. Transparent electrodes (preferably indium tin oxide), are deposited on the inner surfaces of the two substrates in predetermined patterns. The interior surface of one panel is covered by a continuous transparent "ground or back plane" electrode while the interior surface of the opposite panel contains an array of individual transparent electrodes—referred to as "pixels" (picture elements)—configured in an XY matrix. The combination of the Liquid Crystal material, the pixel and back plane electrodes form capacitor-like cell structure between the two substrates. Application of electrical signals to the cells controls the ability of the individual cells to transmit light.

In operation, the orientation of the Liquid Crystal material molecules is controlled by voltages applied to the cell electrodes. The voltages affect the optical properties of the Liquid Crystal material thereby controlling the transmission of light through the cells and thereby the display of information. In a twisted nematic Liquid Crystal Displays crossed polarizer and analyzer elements are positioned on opposite sides of the substrates. Plane polarized light exiting from the polarizer passes through the cell, and its plane of polarization is rotated as it passes through the Liquid Crystal material. Application of voltage to the cell affects the rotation of the Liquid Crystal cell molecules. Below a threshold voltage known as "Off" voltage there is a 90° twist of the Liquid Crystal molecules and a 90° rotation of the plane polarized light so that essentially all of the light is blocked by the analyzer element. As the voltage increases above the "OFF" threshold, the degree to which the molecules are twisted is reduced thereby permitting a portion of the light to be transmitted until a second voltage threshold known as the full "ON" voltage is reached and the degree of twist is reduced to 0° and essentially 100% of the light is transmitted. For voltages between the full "On" and full "Off" levels there are varying levels of light transmission and hence varying levels of brightness. Control of the Liquid Crystal cells to produce gray scale brightness levels is achieved by subdividing the cell voltage into increments between the full "On" and "Off" values.

LCD displays may also produce color images through the incorporation of color filter mosaics in registration with the individual pixel electrodes.

Although the instant invention will be described in connection with a twisted nematic Liquid Crystal Display, the invention is by no means limited thereto and is equally applicable to Guest/Host Displays containing a Liquid Crystal host material supporting one or more dichroic guest dyes.

To display video information in such X-Y Matrix Addressed Liquid Crystal Displays. It is necessary to energize the pixels so as to provide various levels of brightness to establish a gray scale between the "full-on" and the "full-off" states. To this end it is customary to digitize the analog video information in an A to D converter to represent the desired gray scale levels in digital form. The voltage between the "full-on" and "full-off" states is divided into increments to produce the desired number of gray scale brightness levels. The maximum possible number of brightness levels is desirable in order to achieve the best contrast and sharpness of detail. However, there is a practical limitation on the number of gray scale voltage increments that may be derived since the voltage range between the "full-on" and "full-off" states for the Liquid Crystal cell is relatively limited. Sixteen (16) level gray scale is most commonly used although thirty-two (32) and sixty-four (64) level gray scale would be desirable.

However, the transfer function of twisted nematic Liquid Crystal Display between the "full-on" and the "full-off" states (that is, the relationship between pixel voltage vs light transmission or brightness) is non-linear. Thus, even a sixteen (16) level brightness gray scale involves gray scale voltage increments as small as fifty (50) millivolts. Accurately maintaining fifty (50) millivolts increments over the operating temperature range is a difficult task. To provide thirty-two (32) level gray scale by a direct or "brute force" approach; that is by providing thirty-two (32) gray scale voltage increments would require substitution of 5-bit video conversion and driver hardware as well as a gray scale voltage generator and associated circuitry which is capable of generating and maintaining thirty-two (32) gray scale voltage increments some of which are twenty-five (25) millivolts or less over the temperature range. A need therefore exists for video conversion and data line driver circuitry which increases the perceived number of visual gray scale brightness levels without changing the 4-bit, sixteen (16) level hardware or the number of gray scale voltage increments. Specifically, the perceived visual gray scale levels must be increased to thirty-two (32) levels from sixteen (16) levels to improve image quality while utilizing 4-bit driver hardware and only sixteen (16) gray scale voltage increments.

Applicant has found that this highly desirable result may be realized by time multiplexing brightness levels of each pixel between adjacent levels during successive frames. At a frame refresh rate of 60 Hz the eye averages the brightness levels to produce an intermediate brightness level thus doubling the number of perceived gray scale brightness levels realizable with sixteen (16) gray scale voltage increments from sixteen (16) to thirty-two (32).

OBJECTIVES

It is therefore a principal objective of the invention to increase the number of perceived gray scale brightness levels in a Liquid Crystal Matrix Display without increasing the number of gray scale voltage increments.

It is a further objective of the invention to produce thirty-two (32) levels of perceived gray scale brightness in a Matrix Addressed Liquid Crystal Display utilizing only sixteen (16) increments of gray scale voltage.

Still another objective of the invention is to increase the number of perceived gray scale brightness levels in a Matix Addressed Liquid Display by time multiplexing the brightness levels during successive frames to produce intermediate brightness levels.

Still other objectives and advantages of the invention will become apparent as the description thereof proceeds.

SUMMARY OF THE INVENTION

The objectives and advantages of the invention are realized in an arrangement in which the digital video conversion circuitry initially converts the analog video information into a 5-bit digital output. The 5-bits are stored in a frame buffer memory and then outputted as two separate 4-bit and 1-(LSB) bit fields. The gray scale voltage increments applied to the pixels to provide the visual gray scale brightness level averaging by time multiplexing are controlled by the value of the fifth or least significant bit. The 4-bit field representing one of the sixteen (16) increments is applied as one input of a multiplexer. The other input to the multiplexer is controlled by the fifth bit. If the fifth bit is a 1 it is added to the 4-bit field to produce a bit value which is the next higher value of the gray scale voltage increments so that the multiplexer alternately outputs 4-bit command signals representing adjacent gray scale voltage increments and the brightness level is switched or "dithered" between two adjacent brightness levels during successive frames. If the frame refresh rate is high enough the eye averages the brightness value thus producing a total of thirty-two (32) visual gray scale levels with only sixteen (16) increments of gray scale voltage.

DETAILED DESCRIPTION OF THE INVENTION

Figure 1:
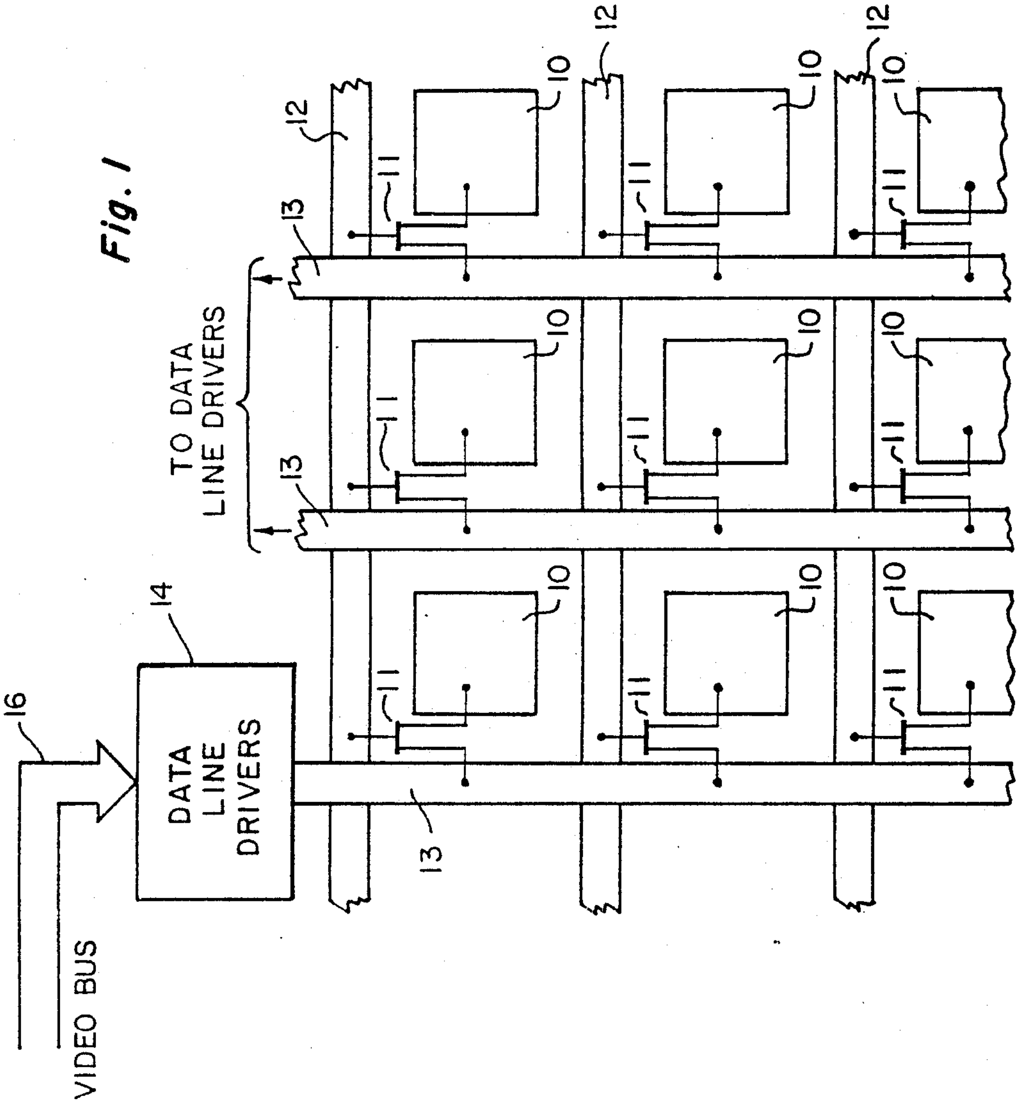
FIG. 1 is a schematic diagram illustrating a portion of a Matrix Addressed Liquid Crystal Display useful with the instant invention.

FIG. 1 is a schematic diagram of a portion of a Matrix Addressed Liquid Crystal Display circuit. In particular FIG. 1 shows a portion of an N by M column and row array of pixel electrodes 10 together with their associated field effect transistor (FET) switching elements 11. The gate electrodes of the switching elements are connected to the gate drive row lines 12. The source electrodes of the FETs are connected to a data columns line 13 and the drain electrodes to pixel electrodes 10. Positioned behind theLiquid Crystal Display is a light source, not shown, which illuminates the rear of the display Transmission of light and hence, the brightness of the display is selectively controlled by the application of the gray scale voltage increments to the individual pixels with application of the voltage to a pixel in any column being controlled by the gate voltages on the gate lines 12.

Data and gate lines 12 and 13 are insulated from each other at their crossover points.

Each data line is coupled to and driven from a data line driver circuit 14 (shown in detail in FIG. 2) only one of which is shown in FIG. 1. The line driver circuits are actuated in response to the digital output signals from a video bus 16 which is coupled to video converter circuitry, shown in detail in FIG. 2. The video circuit converts analog video signals into a 5-bit signal which is processed to select one of sixteen (16) gray scale voltage increments which are applied through driver circuit 14 to the data lines. Depending on the value of the fifth or Least Significant Bit (LSB), of the 5-bit signal the selected gray scale voltages applied to the display pixels on successive frames can be switched between adjacent values thereby time multiplexing or "dithering" the brightness level of the addressed pixel between adjacent brightness values. At a 60 Hz flicker frequency the human eye integrates the brightness levels so that the eye perceives an intermediate brightness level whenever the brightness values are time multiplexed or "dithered". By time multiplexing or "dithering" each of the sixteen (16) increments of gray scale voltages, thirty-two (32) perceived brightness levels are achieved using 4-bit hardware and a sixteen (16) increment gray scale voltage generator.

The manner in which the value of the fifth or LSB bit in the 5-bit command signal is used to double the perceived brightness gray scale levels will be described in detail in connection with the description in FIG. 2. Basically, the 5-bit signal representing the analog video signal is separated into a 4-bit field, representing sixteen (16) levels of gray scale and a 1-bit time multiplexing control field. The 4-bit field is transmitted over one path as a first input to a multiplexer. The 4-bit and 1-bit fields are digitally added in another path to produce a second 4-bit signal which is applied in the other input of the multiplexer. If the 5th control bit is a 1, digital addition in the other path produces a 4-bit value which is greater than the original 4-bit value so that the two inputs to the multiplexer are different. During successive frames the different bit values cause the data line driver circuitry to apply different gray scale voltage increments to the data lines. This time multiplexing of the gray scale increments causes the brightness levels of the pixel to switch or "dither" between adjacent levels; which the eye integrates to produce intermediate brightness levels thus doubling the number of perceived brightness levels.

If the 5th bit value is a 0, digital addition in the other path results in the same 4-bit value so that both inputs to the multiplexer are the same and the driver circuitry applies the same gray scale voltage increment (as determined by the 4-bit value) to the pixels during successive frames.

For example, if the 5-bit command signal is 11001, the 4-bit field is 1100 (i.e., decimal 12 indicating gray scale voltage increment 12 and brightness level 12) and the 1-bit field is 1. The input to the multiplexer from one path is 1100. In the other path when the 4-bit and 1-bit fields are digitally added, and the input to the other multiplexer input terminal is 1101 (decimal 13).

During successive frames of the Liquid Crystal Display, the driver circuitry therefore applies gray scale voltage increments responsive to digital values 1100 and 1101; i.e., voltage increment 12 and voltage increment 13. The pixel brightness levels vary between these values during successive frames producing an intermediate brightness value of 12.5. By time multiplexing and the consequent "dithering" of the pixel brightness during successive frames results in the doubling of the perceived gray scale brightness levels for any given number of gray scale voltage increments.

Figure 2:
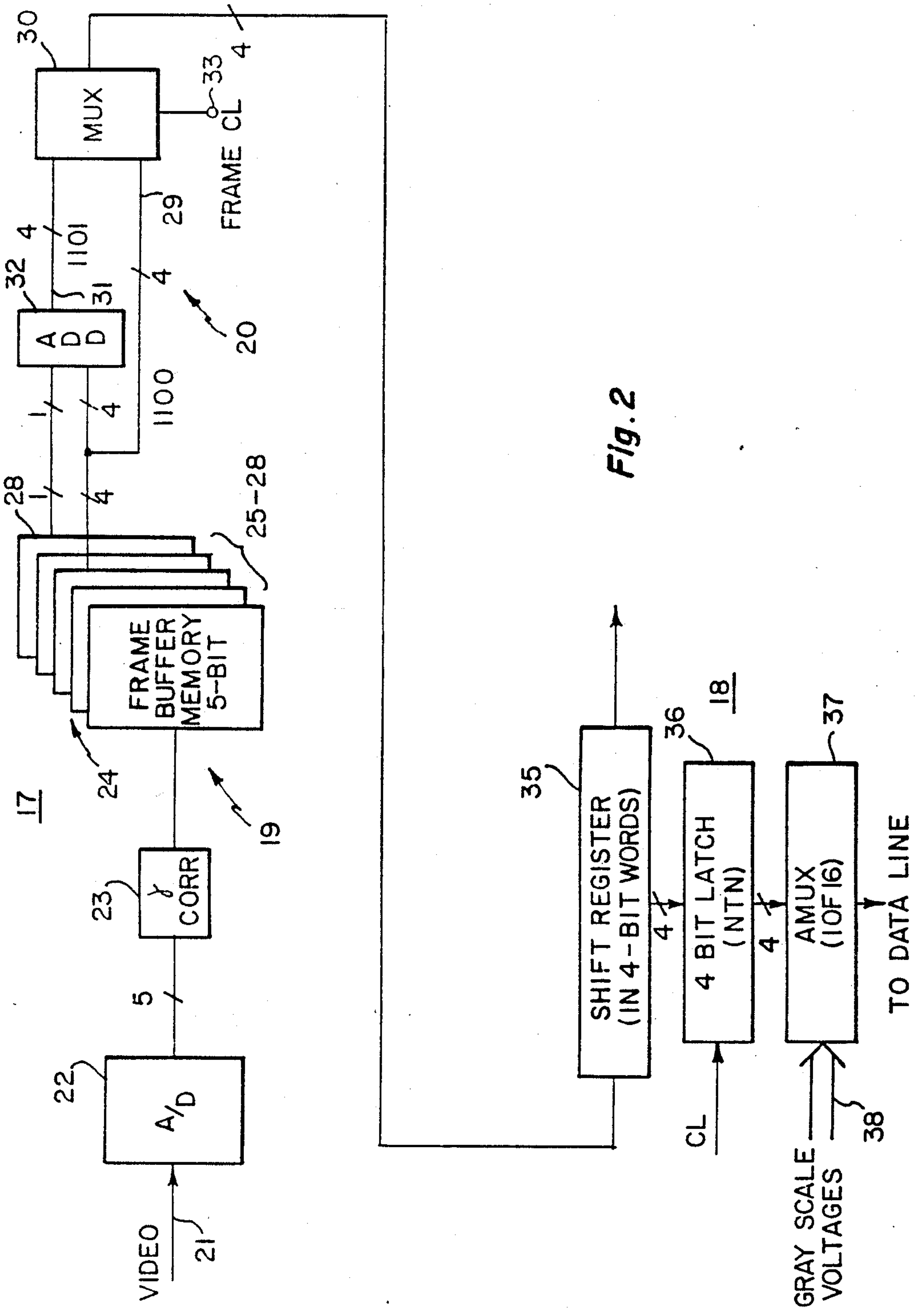
FIG. 2 is a block diagram schematic of the video converter and data line driver circuitry for increasing the number of preceived visual gray scale levels.

FIG. 2 is a schematic block diagram of the video conversion and data line driver circuitry for time multiplexing the gray scale voltage increments. Video conversion circuit 17 provides digital input signals to the 4-bit data line driver circuit 18 which outputs gray scale voltages to the data lines. Video conversion circuit 17 consists of analog to digital video conversion and frame buffer memory 19 and a digital signal processing and multiplexing section 20. The analog video signals may be from a video camera or may be computer generated video graphics which are applied over bus 21 to A/D converter 22 which produces a 5-bit digital output signal representing32 gray scale brightness levels. The 5-bit video signal is applied over gamma correction circuit 23 to frame buffer memory 19 where the 5-bit signal is stored in 5 separate bit mapped planes 24–28. The first 4 bits are stored respectively in memory planes 24–27 and the 5th or least significant bit (LSB) which is used to control the time multiplexing, is stored in plane 28.

Frame buffer 19 is required because the analog signal refresh rate is typically 30 Hz while the Liquid Crystal Display refresh rate is typically higher, viz 120 Hz. Hence the digital video signal is stored in frame buffer memory 19 and clocked out at the 120 Hz refresh rate of the display.

The 5-bit video digital signal from frame buffer memory 19 is outputted as a 4-bit field Frame Buffer planes 24–27 and as a 1-bit (LSB) field from plane 28. The 4-bit field is applied over path 29 to one input of multiplexer 30. The 1-bit (LSB) field is applied over path 31 to the other input of multiplexer 30. The 1-bit field is applied as one input to a digital adder 32 forming part of path 31. The other input to digital adder 32 is the 4-bit field from path 29. The 4-bit output of adder 32 is the digital sum of the 4-bit and 1-bit fields. If the (LSB) is a 1, the Adder output has a new digital value; if it is a 0 it is the same as the original 4-bit field value; viz, 1100.1 results in 1101, and 1100.0 results in 1100.

Clock input terminal 33 of multiplexer 30 receives clock pulses at the 120 Hz refresh rate of the Liquid Crystal Display and during successive frames outputs the 4-bit signals at the multiplexer input terminals to data line driver circuit 18.

The multiplexer output signal is applied to serial shift register 35 which forms part of driver circuitry 18 and which has one output for each data line driven by circuit 18, and only 1 of which is shown in FIG. 2. The output from the nth register terminal to drive data line is applied to a 4-bit latch 36 in which the 4-bit gray scale voltage control signal is stored. Where the number of data lines is quite large the shift registers may be broken up to drive only limited numbers of lines, as for example 50. The 4-bit signals in the latch are outputted and control a multiplexer 37 which has 16 input ports (not shown) to which the 16 gray scale voltage increments are applied over bus 38.

Depending on the value of the 4-bit command signal from latch 36 one of the sixteen (16) gray scale increments are applied to its associated data line and to the individual pixels connected to that data line whenever the field effect transistor switches are energized from the row switching lines to connect the data line to the pixels. During each frame data lines 12 are successively connected to the pixels to apply gray scale voltage increment to the pixel electrode in accordance with the ditial 4-bit value of the video information.

As pointed out previously, the transfer function (voltages vs brightness) for a Liquid Crystal Display is nonlinear in that equal gray scale voltage increments do not produce equal gray scale brightness level changes. Since equal brightness level changes are desired, the gray scale voltage increments $V_1$ to $V_{16}$ must be properly varied to provide 16 equal gray scale brightness levels $B_v$ as the pixels are energized by the gray scale voltage increments. Table I illustrates the non-linear nature of the transfer function and the manner in which the voltage increments must be controlled to produce 16 brightness level changes in going from the full "OFF" to the full "ON" in accordance with the digital 4-bit value of the video information.

TABLE I

| Voltage (V) | Voltage Values | Brightness Level B | Voltage Increments ΔV |
|---|---|---|---|
| $V_1$ | .194 | $B_1$ | — |
| $V_2$ | 2.017 | $B_2$ | 1827 |
| $V_3$ | 2.074 | $B_3$ | 57 |
| $V_4$ | 2.127 | $B_4$ | 53 |
| $V_5$ | 2.187 | $B_5$ | 60 |
| $V_6$ | 2.238 | $B_6$ | 51 |
| $V_7$ | 2.291 | $B_7$ | 53 |
| $V_8$ | 2.332 | $B_8$ | 41 |
| $V_9$ | 2.370 | $B_9$ | 38 |
| $V_{10}$ | 2.489 | $B_{10}$ | 119 |
| $V_{11}$ | 2.584 | $B_{11}$ | 95 |
| $V_{12}$ | 2.718 | $B_{12}$ | 134 |
| $V_{13}$ | 2.956 | $B_{13}$ | 238 |
| $V_{14}$ | 3.599 | $B_{14}$ | 643 |
| $V_{15}$ | 4.893 | $B_{15}$ | 1294 |
| $V_{16}$ | 6.497 | $B_{16}$ | 1604 |

It can be clearly seen from Table I the incremental gray scale voltage changes vary from 38 millivolts to 1.827 volts. The gray scale voltage generator required to produce the 16 incremental gray scale voltages, not shown in FIG. 2, may take a variety of forms. A preferred version is a precision resistor ladder voltage divider network. The voltage network has sixteen (16) taps with opposite ends of the resistor network having voltages $V_H$ and $V_L$, representing the full "ON" and full "OFF" conditions applied thereto. The voltages from the taps are coupled through operational amplifier and over a bus to the sixteen (16) input ports of the multiplexer.

Figure 3:
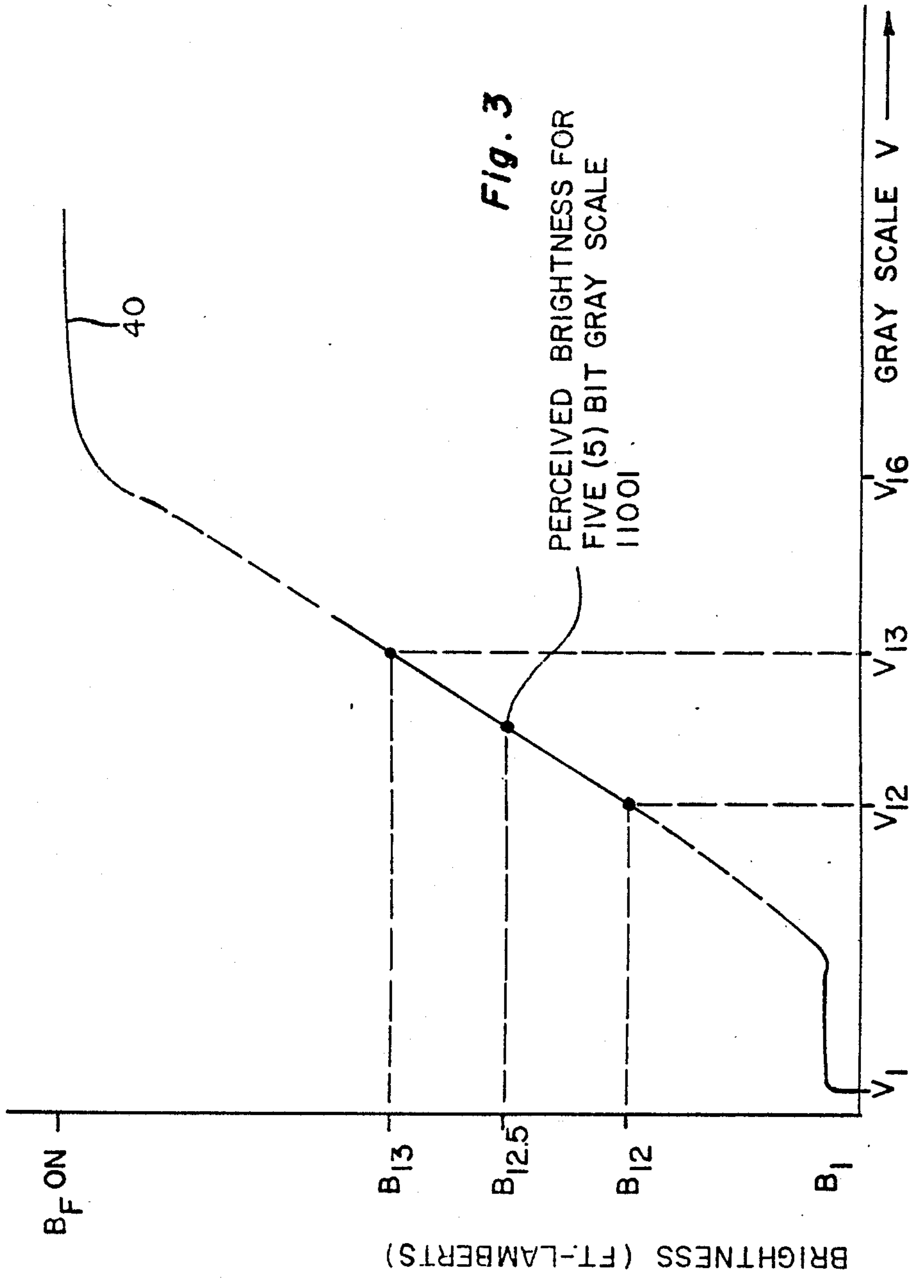
FIG. 3 is a plot of brightness versus voltage illustrating the manner in which the gray scale voltages and brightness levels are time multiplexed or "dithered" to produce an intermediate perceived value of brightness.

FIG. 3 illustrates graphically, the manner in which time multiplexing of the individual pixel during alternate frames produces intermediate values of perceived brightness thereby doubling the number of perceived brightness levels for any given number of gray scale voltage increments. In FIG. 3, curve 40 illustrates the transfer function (voltage versus brightness level) for a typical twisted nematic Liquid Crystal cell. Brightness in Ft Lamberts is plotted along the ordinate and the gray scale voltages $V_1$ to $V_{16}$ are plotted along the abscissa and illustrate the example previously discussed; that is, a 5-gray scale command signal having a 5th bit with a value of 1. During one frame the gray scale voltage outputted to a given data line with a 5-bit gray scale voltage of 11001 is $V_{12}$ (i.e., the digital value of the 4-bit command signal of 1100 and pixel brightness level is $B_{12}$.) During the next frame the 4-bit command signal is 1101 and the driver circuitry outputs a gray scale voltage $V_{13}$ to the data line. The pixel brightness value is thus $B_{13}$ during the next frame. With a 120 Hz refresh rate the eye does not distinguish the difference in brightness levels. The eye integrates them to produce an intermediate brightness level, $B_{12.5}$. For each command signal, time multiplexing or "Dithering" of the individual gray scale voltage increments, doubles the number of brightness levels achievable for any given number of gray scale voltage increments. Specifically, Thirty two (32) brightness levels are possible using only sixteen (16) gray scale voltage increments and their associated 4-bit hardware.

If the 5th bit of the 5-bit command signal from the video A to D converter and from memory is a 0, then during each frame the voltage value, for the example given, is $V_{12}$ (i.e., for a digital command signal 11000, the brightness level remains at $B_{12}$.)

From the foregoing discussion it will be apparent that an improved Matrix Liquid Crystal Display is provided in which the number of gray scale brightness levels can be doubled without any increase in the number of gray scale voltage increments required to drive the Liquid Crystal Display.

While a particular embodiment of the invention has been shown, it will be understood that the invention is by no means limited thereto since many modifications may be made in the structural arrangement and in the instrumentalities employed. It is contemplated by the appended claims to cover any such modifications as fall within the true spirit and scope of the invention.

What is claimed as new and desired to be secured by U.S. Letters Patent is:

1. A Liquid Crystal Display system comprising:

a Liquid Crystal device having;

(a) a first array of parallel data transmitting conductors and, (b) a second array of parallel data control conductors, said first and second arrays forming a matrix grid, (c) a matrix of individual cells including a Liquid Crystal material connected to said first and second arrays of parallel conductors through individual transistor switch means connected between the conductors of said first array and said individual cells for supplying data in the form of gray scale voltage increments to said cells, the gates of said individual transistor switch means being connected to said second array of conductors to recurrently apply gray scale voltage increments to said cells, (d) a source of n gray scale voltage increments, (e) line driver means for receiving and recurrently applying said voltage increments to said first array of conductors for controlling the brightness levels of each said cells in response to said gray scale voltage increments, (f) means for producing 2 n gray scale brightness levels from the n gray scale voltage increments, including (1) means for time multiplexing the gray scale voltage increments applied to said first array during successive display frames between adjacent values, (2) analog to digital conversion means for converting an analog video signal to a digital signal having 2 n levels of the analog video signal amplitude and having a number of bit positions representing the desired 2 n brightness levels, (3) means for processing said digital signals to produce signals representing the selected value of one of the n gray scale voltage increments, (4) means responsive to the value of the least significant bit of the bits, to establish a digital value which selectively changes values between adjacent gray scale voltage increment values, (5) means responsive to the digital value for controlling said line driver means to apply selected adjacent voltage increments to the cells during successive frames in accordance with the ditial bit values to produce said intermediate brightness levels as the brightness level is switched between adjacent levels during successive frames whereby 2 n levels of brightness may be achieved with n gray scale voltage increments.

2. The Liquid Crystal Display system according to claim 1 wherein n is equal to 16, and 16 gray scale voltage increments are provided and a 5 bit signal is produced from said analog video signal, means for processing said 5-bit signal to produce a first 4-bit signal from the 4 most significant bits representing one of the 16 gray scale voltage increments, and a second 4-bit signal having a digital value depending on the 5th bit; the digital value of said second 4-bit signal being the same as the first 4-bit signal if the 5th bit is a 0 and having a digital value representing the next higher gray scale voltage increment if the fifth bit is a 1, said first and second 4-bit signals being applied alternately to said line driver means during successive display frames, whereby the brightness level of any cell is the same during successive frames if the 5th bit is 0 and is varied between brightness levels during successive frames to produce an intermediate level if the 5th bit is 1 thereby producing 32 brightness levels with 16 voltage increments.

3. The Liquid Crystal Display according to claim 2 wherein said first and second 4-bit signals are applied as input said time multiplexing means which actuated at the display frame repeat rate to alternately output said first and second 4-bit signals to said line driver means to apply voltage increments to said first array in accordance with the digital value of said 4-bit signals during successive frames.

4. The Liquid Crystal Display according to claim 3 wherein said 5-bit signal is separated into the most significant 4-bits and the 5th least significant bit.

5. The Liquid Crystal Display according to claim 4 wherein the 4 most significant bits are applied to one input of said time multiplexing means, and means for digitally adding the 4 most significant bits and the least significant bit to produce a 4 digital bit the value of which depends on the value of the fifth bit, and means for applying the 4-bit output from said adding means to the second input of said time multiplexing means.

* * * * *